United States Patent [19]

Fedorovich et al.

[11] Patent Number: 4,552,367
[45] Date of Patent: Nov. 12, 1985

[54] HUB SEAL AND AXLE ASSEMBLY AND METHOD FOR ITS ASSEMBLY

[75] Inventors: George Fedorovich; Kenneth C. Kirkland; Jim F. McGraw, all of Longview, Tex.

[73] Assignee: Garlock, Inc., Palmyra, N.Y.

[21] Appl. No.: 552,280

[22] Filed: Nov. 16, 1983

[51] Int. Cl.⁴ .............................................. F16J 15/32
[52] U.S. Cl. ......................................... 277/1; 277/37; 277/153
[58] Field of Search ................................. 277/35–42, 277/152, 153, 178

[56] References Cited

U.S. PATENT DOCUMENTS

| | | |
|---|---|---|
| 3,011,814 | 12/1961 | Rhoads et al. ......................... 277/37 |
| 3,021,161 | 2/1962 | Rhoads et al. ......................... 277/37 |
| 3,022,081 | 2/1962 | Kosatka . |
| 3,086,781 | 4/1963 | Hudson et al. . |
| 3,275,333 | 9/1966 | Scott et al. . |
| 3,363,911 | 1/1968 | McKinven, Jr. . |
| 3,482,844 | 12/1969 | McKinven, Jr. . |
| 4,037,848 | 7/1977 | Prescott et al. ......................... 277/37 |
| 4,037,849 | 7/1977 | Thumm . |
| 4,083,567 | 4/1978 | Thumm . |
| 4,283,063 | 8/1981 | Prescott ......................... 277/37 |

*Primary Examiner*—Robert I. Smith
*Attorney, Agent, or Firm*—Sixbey, Friedman & Leedom

[57] ABSTRACT

A one-piece hub seal sleeve is slip fit onto a cooperating element to properly locate and orient that sleeve prior to affixing the sleeve to the cooperating element. A flange on a trailing portion of the sleeve can abut a bearing race of a wheel assembly during installation of the sleeve to keep the sleeve properly oriented and located during assembly.

16 Claims, 7 Drawing Figures

HUB SEAL AND AXLE ASSEMBLY AND METHOD FOR ITS ASSEMBLY

DESCRIPTION

1. Technical Field

The present invention relates, in general, to hub seals, and, more particularly, to hub seals which can be installed with only a minimum amount of tooling.

2. Background Art

Known hub seals include sleeves which are fixed to a cooperating element, such as an axle, by means of a press fit. Press fitting heretofore known hub seals in place requires the use of heavy hammers and special installation tools, and such installation equipment has proven to be expensive to purchase and difficult to maintain in easily accessible locations. Furthermore, use of such heavy tools may damage the seal during installation and may cause the seal to be placed in an undesirable location or orientation on the axle.

Hub seals which can be installed by hand are disclosed in U.S. Pat. Nos. 4,083,567 and 4,037,849. However, even those hub seals which can be installed by hand are subject to failure resulting from improper orientation during assembly. Known hand installable hub seals include a plurality of sleeve parts assembled together and are thus subject to many problems. These parts can bind, slip or cock during assembly and have a potential leak path at the joints of the parts. Still further, these seals must have rubber on both inside and outside surfaces because a normal metal press fit requires more force than can be applied by hand.

A seal which is subject to binding may have slip occurring in the bore or on the axle instead of between the seal parts intended to accommodate slippage thus creating the possibility of seal failure. Efforts to avoid such slippage have necessitated compromises in seal design in the area of radial lip loading with resultant reduction in the operating effectiveness of such seals. Even if undesired slipping is not present in these prior seals, failure is still possible because a seal which is improperly installed or improperly oriented may force a seal lip to follow an eccentric path around the sleeve.

Therefore, there is a need for a hub seal which can be installed by hand but which can easily be placed in the proper position and orientation relative to a wheel bearing and does not have extra joints which may create possible leak paths.

Currently known hub seals such as those hub seals disclose in U.S. Pat. Nos. 3,022,081, 3,086,781, 3,175,333 and 3,482,844 have no means for guiding, locating or orienting a hub seal into position when they are initially placed on an axle and prior to establishing the press fit between the hub seal sleeve and the axle. Without such means, these known hub seal sleeve are subject to the above-mentioned locating and orienting problems when they are press fit to a cooperating element. Any relieved area on these known hub seal sleeves is not intended to provide means for locating and orienting the seal sleeve during an assembly process, and generally defines a gap between the axle or hub and the sleeve which is so large as to preclude all but incidental contact between the seal sleeve and the axle or hub during the initial phases of assembly.

There is thus need for a hub seal which has means for guiding and locating a hub seal sleeve into a press fitting position on an axle prior to actually fixing that sleeve to the axle.

Disclosure of the Invention

It is the primary object of the present invention to provide a novel and improved sleeve for a hub seal which can be hand guided and oriented into position to be affixed to a cooperating element, such as an axle of a wheel assembly. Hand guiding and locating insures that the hub seal sleeve can be installed without the use of heavy tools and expensive equipment and further reduces the possibility that the hub seal sleeve will be damaged during installation.

Another object of the present invention is to provide a novel and improved hub seal sleeve which is slip fit into position to be affixed by a press fit to an axle. The slip fit with the axle produces sliding contact between the hub seal sleeve and the axle and is established prior to establishing the press fit. That portion of the hub seal sleeve which is slip fit onto the axle leads the sleeve onto the axle with the press fit occurring at a trailing portion of the sleeve.

A further object of the present invention is to provide a novel and improved hub seal sleeve which includes a material on one portion thereof which establishes or enhances a press fit of the hub seal sleeve onto an axle.

Yet another object of the present invention is to provide a novel and improved hub seal sleeve having a flange on a trailing end thereof which is used to properly locate and orient the sleeve during installation of the sleeve onto an axle.

A still further object of the present invention is to provide a novel and improved hub seal sleeve which establishes a slip fit with a supporting axle for a major portion of the axial length of the sleeve so that the sleeve can be accurately positioned and oriented by hand for a major portion of the installation of that sleeve onto the axle.

Still another object of the present invention is to provide a novel and improved hub seal sleeve having a one-piece construction so there is virtually no potential leak path through the sleeve and the possibility of reactive binding or cocking of sleeve parts is eliminated.

These objects are accomplished by providing a hub seal having a sleeve with only one metal member and with a relieved portion on the end thereof which leads the sleeve into engagement with a cooperating element to define a slip fit between the sleeve and that cooperating element. The slip fit is designed to establish sliding contact between the sleeve and an axle so the sleeve can be hand located and hand oriented onto the axle prior to establishing the press fit. Preferably, the clearance of the slip fit and the interference of the press fit are both in the range of thousandths of an inch.

BEST MODE FOR CARRYING OUT THE INVENTION

Figure 1:
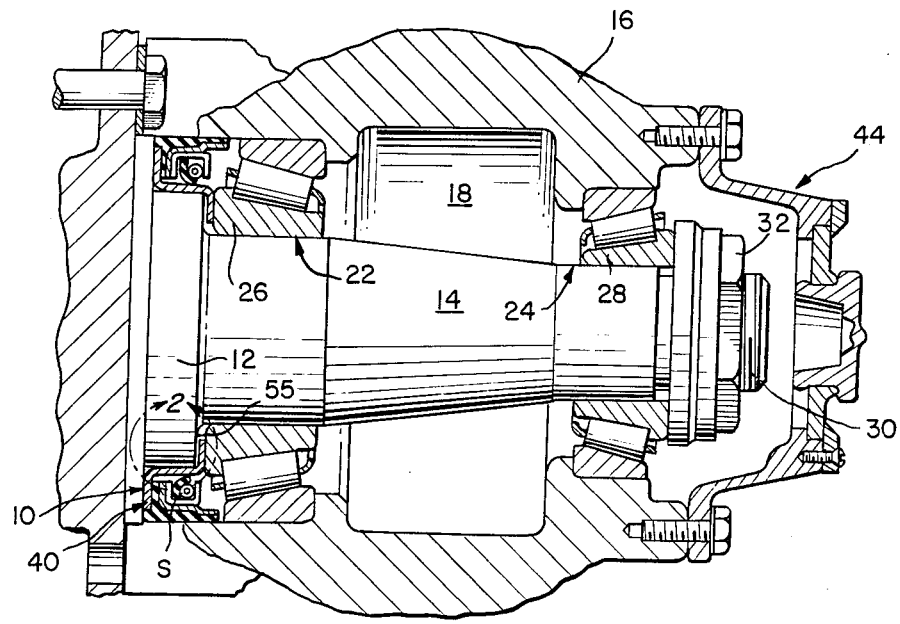
FIG. 1 is a longitudinal cross section of a wheel assembly utilizing a hub seal having a sleeve which embodies the teachings of the present invention.

As shown in FIG. 1, a hub seal 10 is mounted in a wheel assembly to provide a fluid and dust tight joint between an axle shoulder 12 of an axle 14 and a hub 16 surrounding that axle. The seal 10 may be unitized or semiunitized, but can also assume other forms as required, and the axle 14 may be fixed or rotating with the hub being rotatable or fixed as required.

The hub seal 10 includes a sealing member S which prevents egress of a fluid from an oil pocket 18 past the hub seal, and also prevents ingress of external contaminants axially along the axle toward an inner bearing 22. Inner bearing 22, along with an outer bearing 24, rotatably mounts the hub 16 on the axle 14, and each bearing includes a race indicated respectively at 26 and 28. It will be noted that axially inner bearing race 26 is mounted adjacent or proximate to the axle shoulder 12.

As shown in FIG. 1, terminal end 30 of the axle 14 has an adjusting nut 32 threadably mounted thereon and is enclosed by a housing cover 44. In the present invention, the adjusting nut 32, in addition to performing its normal function, also serves to seat the hub seal 10 so no special tools are needed to install the hub seal in proper alignment. Use of the adjusting nut in the installation of the hub seal 10 will be discussed hereinafter.

The hub seal 10 includes a one-piece wear sleeve 40 which is shown in FIGS. 1-4 as being affixed to the axle shoulder 12. The wear sleeve is a one-piece metal unit which can be manufactured easily and cheaply, and includes a lead-on portion 42 and a trailing portion 44 on a central web portion 46. The sleeve 40, shown in FIG. 2, includes a flange 50 which extends radially outwardly of the axle 14 when the sleeve is in place on the axle and a flange 54 which extends radially inwardly toward the axle 14. The flange 54 is used to orient and position the sleeve on the axle by abutting a radial face 55 of the the shoulder 12.

The web portion 46 extends between the flanges 50 and 54, and is dimensioned to surround the axle shoulder 12. This web portion includes a stepped inner surface 60 facing the axle shoulder. The stepped inner surface provides a sleeve section 60T of reduced diameter at the trailing portion 44 to establish a press fit between the surface of section 60T and the axle shoulder 12. The stepped surface additionally provides a sleeve section 60L of a larger diameter at the lead-on portion 42 to establish a slip fit between the surface of sleeve section 60L and the axle shoulder 12. This slip fit requires a slight clearance gap 62 between the surface of sleeve section 60L and an outer surface 64 of the axle shoulder 12, and to provide this gap, the sleeve section 60L extends for at least a major portion, and preferably substantially more than one half of the axial length of the sleeve to a shoulder 66 which joins the sleeve section 60L to the sleeve section 60T. As thus defined, the shoulder 66 defines the transition between a slip fit and press fit sleeve condition and the transition portion formed by the shoulder 66 can be a step or a ramp.

Assembly of the sleeve 40 onto the axle 14 is begun with the adjusting nut 32 and hub 16 removed. The sleeve is inserted over the end of the axle with the lead-on portion 42 first, and is slip fit by hand into a position to be subsequently press fit onto the axle. The slip fit feature and sliding contact between the sleeve and the axle established by such slip fit permits accurate location of the sleeve but includes a small amount of clearance to permit hand location of that sleeve into the desired position and orientation. In the preferred embodiment, the clearance established by the gap 62, as well as the interference established at the sleeve trailing portion 44, can range from about two one-thousandths of an inch to about ten to twelve one-thousandths of an inch. Therefore, the slip fit at the lead-on portion 42 up to the shoulder 66 could be described as a transition fit according to the American Standard Association (ASA B4.1, 1955); wherein the press fit at the last quarter inch or so established by the sleeve section 60T could be described by the same standards as a medium drive fit. The axial extent of the press fit portion 60T of the sleeve can vary, although this press fit portion is normally of a smaller axial extent than that of the sleeve section 60L. From the above discussion, it can also be seen that the size of gap 62 is exaggerated in the figures for illustrative purposes.

Figure 2:
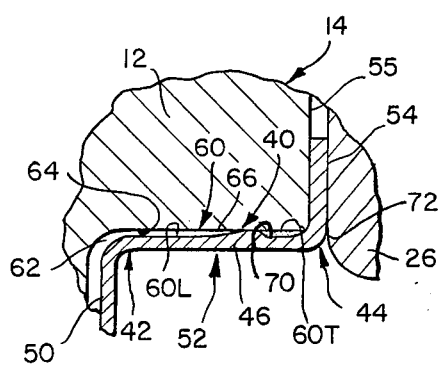
FIG. 2 is an enlarged detailed view of that portion encircled by arrow 2 in FIG. 1.

A sealant layer 70 can be interposed between the axle surface 64 and sleeve portion 60T to improve the press fitting relationship between the surface of the sleeve and the axle, and further to insure against leakage between the sleeve and the axle. Flange 54 confines the sealant 70 away from the area of the bearing rollers, and this sealant will flow as the sleeve is forced into final position. Thus, as shown in FIG. 2, the sealant 70 will flow onto the sleeve portion 60T adjacent to the shoulder 12 as well as being located adjacent to corner 72 of the sleeve.

The bearings 22 and 24 are manufactured to close tolerances and may be used to accurately locate the seal 10 axially on the hub 16. The seal is positioned by sandwiching the flange 54 between inner race 26 and axle shoulder 12 so that during assembly, the bearing race 26 locks the seal sleeve 40 in a proper orientation.

After the sleeve is slip fit into position by hand and the sealing elements installed, the hub 16 is placed on the axle 14. Then, with the bearing race 26 in place to push against the flange 54, the adjusting nut 32 is tightened in the usual manner sufficiently to push the sleeve into the final position with the press fit established between the trailing portion 44 and the axle shoulder 12 to affix the sleeve to that axle. Once the sleeve is affixed to the axle, the adjusting nut 32 is loosened enough to permit proper bearing function during operation of the wheel assembly.

Figure 3:
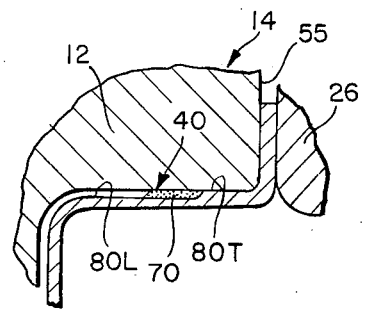
FIG. 3 is a view similar to FIG. 2 showing another form of the sleeve embodying the teachings of the present invention.

The press fit between the trailing portion of the sleeve 40 and the axle shoulder 12 can also be established by interposing a solvent based nitrile, Hylomar jointing compound PL32, bonded rubber, molded plastic or the like at or near location 80T as shown in FIG. 3. When bonded rubber or molded plastic is used, the slip fit section 60L can be reduced or eliminated, while the press fit interference would be increased to about 0.010 to 0.030 inches.

Figure 4:
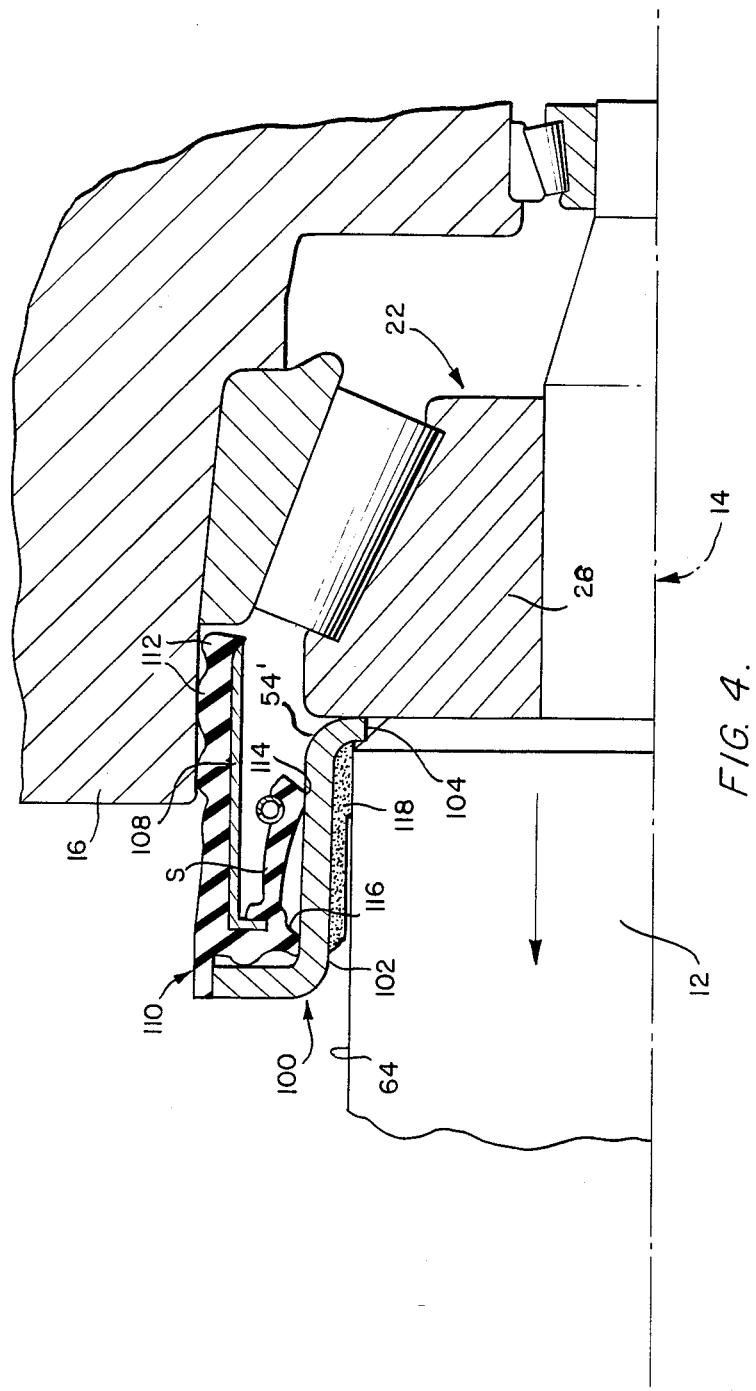
FIG. 4 is a fragmentary longitudinal cross section view of a top half of a wheel assembly which includes a seal utilizing another form of the seal sleeve embodying the teachings of the present invention.

The sleeve 100 shown in FIG. 4 is similar to the sleeve 40, with a flange 54' of the sleeve 100 being much smaller than the flange 54 of the sleeve 40 so bearing race clearances are not disturbed by the presence of a flange. In a preferred form of flange 54', the diameter of flange inner rim 104 is from about 0.002 inches to about 0.030 inches less than the outer diameter 64 of axle shoulder 12 so that the flange 54' acts as an axial stop without being interposed between the bearing race 26 and the axle shoulder 12. If the bearing race is larger in diameter than the sleeve, the sleeve will be pushed over the axle shoulder, by the bearing race during assembly but the flange 54' will still not be clamped between the bearing race and the axle shoulder. Thus the flange 54' will not prevent the bearing race 28 from moving into direct abutment with the shoulder 12 face 55 of the during assembly, for the flange will either expand or deform outwardly to move over the shoulder as the bearing race 28 moves in the direction of the arrow in FIG. 4 during assembly. This expansion of deformation continues until the bearing race comes to rest against the shoulder 12. For some applications, it is extremely important that the bearing race be positioned against the shoulder with no space between the two, for otherwise, other wheel components, such as mating brake units, may be misaligned. Consequently, for these applications, the sleeve 100 becomes extremely important, for the flange 54' will accurately position the sleeve on the shoulder 12, but will expand over the shoulder to permit the bearing race to abut the shoulder.

FIG. 4 provides a good illustration of the seal member S of of the hub seal 10. This seal member includes a reinforcing shell 108 of metal or other suitable material having a one piece elastomeric element 110 bonded thereto. This elastomeric element includes circumferential projecting beads or ridges 112 abutting a surface of the hub 16 for holding the seal S in place, and seal lips 114 and 116 engaging the wear surface of the sleeve 100.

Figure 5:
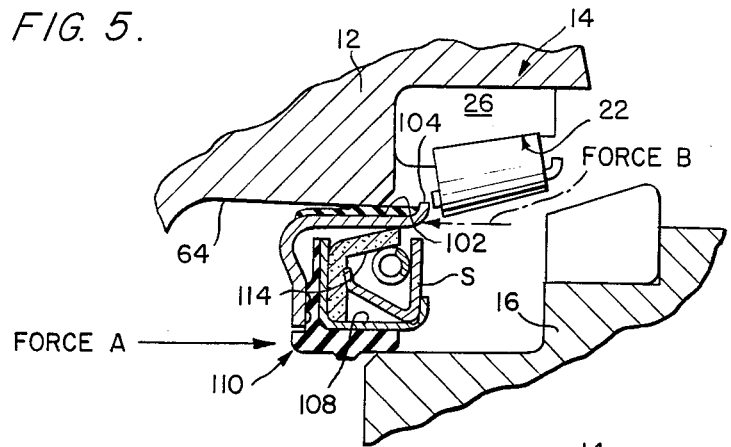
FIGS. 5-7 illustrate installation of a seal embodying the teachings of the present invention when a bearing race is smaller than an axle shoulder outer surface via showings of a bottom half portion of the assembly.
Figure 6:
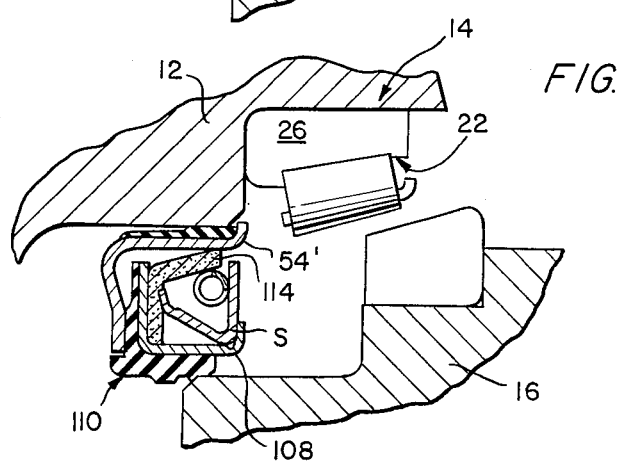
Figure 7:
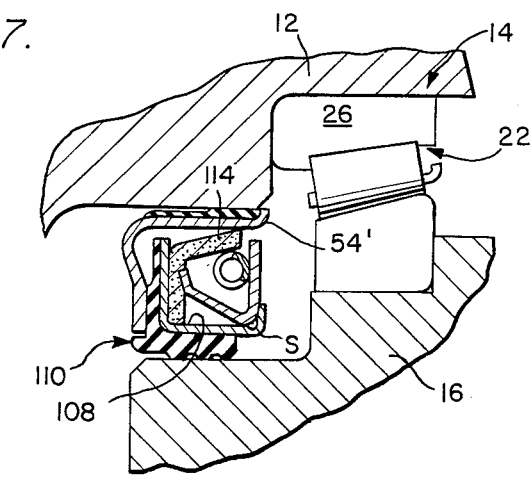

Shown in FIGS. 5-7 is an embodiment wherein the bearing race is smaller than the axle sleeve. With reference to FIGS. 5-7, when the bearing race 26 is smaller than the axle shoulder outer surface 64, the sleeve can be installed by hand into the final position where the flange 54' contacts the axle 14 thereby preventing further movement. In such a situation, a first force A required to install the seal member S into the bore would preferably be larger than second force B required to install the sleeve 40 or 100 so that after first starting the sleeve, with the seal assembled on the axle, placing the hub 16 on the axle 14 and tightening the adjusting nut 32, the first force A overcomes the second force B until the flange 54' contacts shoulder 12 stopping further sleeve movement (FIG. 6). By then increasing force B until it overcomes the first force A, the seal can then be installed into the proper position in the bore. The press fit of the seal can be established by proper selection of seal diameter and materials.

As was the case above, the press fit of sleeve 100 onto the axle can be established by the proper selection of sleeve diameter or by interposing shim means between the sleeve and the axle. The shim means can include a layer of elastomeric material or molded resin 118, which may be ribbed if suitable. As shown in FIG. 4, the shim means extends from adjacent to the flange 54' for a major portion of the axial length of the installed sleeve. However, as was the case with sleeve 40, the shim means can extend for a shorter axial distance along such installed sleeve.

Industrial Applicability

While the invention has been disclosed hereinabove in a wheel assembly, it can be used in any application where a seal is interposed between one element which rotates with respect to another element.

We claim:

1. A method of assembling a hub seal sleeve onto a cooperating element comprising the steps of:

slip fitting a hub seal sleeve onto a cooperating element of an axle to a location where it is retained on the cooperating element adjacent to but short of a final, operative position of the hub seal sleeve on the cooperating element; and press fitting the hub seal sleeve onto the cooperating element to an extent requiring a force at least substantially as great as the maximum which can be applied by hand by displacing the hub seal to the final, operative position thereof on the cooperating element via the sub-steps of assembling a hub on the axle, and tightening an adjusting nut onto the axle in a manner applying a force which pushes the hub seal sleeve further onto the cooperating element.

2. The method defined in claim 1, further including the step of trapping a flange on the hub seal sleeve between a shoulder on the cooperating element and a bearing race associated with that cooperating element.

3. The method defined in claim 1, further including a step of placing sealant between the hub seal sleeve and the cooperating element.

4. The method defined in claim 1, further including a step of preassembling the seal to the hub seal sleeve.

5. The method defined in claim 1, wherein the hub is assembled on the axle via a bearing assembly during said assembling sub-step, and wherein the adjusting nut causes part of the bearing assembly to push against the hub seal sleeve during said tightening sub-step.

6. A hub and axle assembly comprising an axle having a shoulder; a hub seal sleeve having an annular web with a lead-on portion sized relative to said shoulder for creating a manually obtainable slip fit connection therebetween and a trailing portion that is sized relative to said shoulder for creating a press fit connection therebetween to an extent requiring a force at least substantially as great as the maximum which can be applied by hand; a hub; a bearing assembly; and an adjusting nut; wherein said hub seal sleeve is disposed on said shoulder at a position wherein the slip fit connection has been formed between the axle shoulder and the lead-on portion, but short of a final position of the hub seal sleeve wherein the press fit connection is formed; wherein said hub is assembled on the axle via the bearing assembly; and wherein said adjusting nut is tightened onto said axle to a position wherein the adjusting nut engages a part of said bearing assembly and said adjusting nut forms a means for producing the press fit connection between the trailing portion of the hub seal sleeve and the axle shoulder by applying a force which pushes the hub seal sleeve further onto the shoulder, upon further tightening of the adjusting nut.

7. The hub and axle assembly defined by claim 6, wherein the hub seal sleeve is provided with a radially inwardly extending flange on an end of the annular web in a manner forming a means for contacting and positioning the sleeve on the axle shoulder upon said further tightening of the adjusting nut.

8. The hub and axle assembly defined by claim 7, wherein said radially inwardly extending flange is positioned relative to said bearing assembly so as to be engaged thereby upon said further tightening of the adjusting nut.

9. The hub and axle assembly defined by claim 8, wherein said radially inwardly extending flange is size and arranged relative to said shoulder for engaging the shoulder in a manner limiting the distance that the hub seal sleeve may be displaced onto said shoulder by said further tightening of the adjusting nut.

10. The hub and axle assembly defined by claim 7, wherein said radially inwardly extending flange is size and arranged relative to said shoulder for engaging the shoulder in a manner limiting the distance that the hub seal sleeve may be displaced onto said shoulder by said further tightening of the adjusting nut.

11. The hub and axle assembly defined by claim 6, wherein the slip fit connection formed between the axle shoulder and the lead-on portion extends for more than one half the axial length of the annular web.

12. The hub and axle assembly defined by claim 6, wherein said hub seal sleeve is a one piece element and wherein a seal assembly for sealing against said hub, including a one-piece reinforcing shell having a sealing means secured thereto, is joined to the hub seal sleeve.

13. The hub and axle assembly defined by claim 12, wherein the seal assembly is joined to the hub seal sleeve at a radially outwardly extending flange provided at an end of said web.

14. The hub and axle assembly defined by claim 13, wherein said radially outwardly extending flange is longer than a radially inwardly extending flange provided, at an opposite end of the web from the radially outwardly extending flange, as means for contacting and positioning the sleeve on the axle shoulder upon said further tightening of the adjusting nut.

15. The hub and axle assembly according to claim 7, wherein said radially inwardly extending flange has an end edge surface that defines an opening having a diameter that is from 0.002 to 0.030 inches less than the diameter of the axle shoulder.

16. The hub and axle assembly defined in claim 15, wherein said radially inwardly extending flange is positioned relative to said bearing assembly so as to be engaged thereby upon said further tightening of the adjusting nut.

* * * * *